(12) United States Patent
Neumann et al.

(10) Patent No.: US 12,441,561 B2
(45) Date of Patent: Oct. 14, 2025

(54) ARRANGEMENT AND METHOD FOR INTRODUCING A ROLL CONTAINER INTO A ROLL CONTAINER LOADING STATION (71) Applicant: BEUMER GROUP GMBH & CO. KG, Beckum (DE)

(72) Inventors: Nils Neumann, Rheda-Wiedenbrück (DE); Jan Josef Jesper, Delbrück (DE); Brian Hansen, Klarup (DK)

(73) Assignee: BEUMER GROUP GMBH & CO. KG, Beckum (DE)

( * ) Notice: Subject to any disclaimer, the term of this patent is extended or adjusted under 35 U.S.C. 154(b) by 0 days.

(21) Appl. No.: 18/841,024

(22) PCT Filed: Feb. 23, 2023

(86) PCT No.: PCT/DE2023/100144
§ 371 (c)(1),
(2) Date: Aug. 23, 2024

(87) PCT Pub. No.: WO2023/160756
PCT Pub. Date: Aug. 31, 2023

(65) Prior Publication Data
US 2025/0171255 A1   May 29, 2025

(30) Foreign Application Priority Data

Feb. 25, 2022 (DE) .............. 10 2022 104 554.4

(51) Int. Cl.
*B65G 65/32* (2006.01)

(52) U.S. Cl.
CPC ...... *B65G 65/32* (2013.01); *B65G 2201/0235* (2013.01); *B65G 2203/0283* (2013.01); *B65G 2203/041* (2013.01)

(58) Field of Classification Search
CPC ............ B65G 65/32; B65G 2201/0235; B65G 2203/0283; B65G 2203/041; B65G 47/96; B65G 69/16; B65G 65/00
See application file for complete search history.

(56) References Cited

U.S. PATENT DOCUMENTS 7,547,176 B2 * 6/2009 Blackwell ................ B07C 1/00
141/153
8,556,084 B1  10/2013 Snook
(Continued)

FOREIGN PATENT DOCUMENTS

CN      111071708 A     4/2020
DE   102010060483 A1    5/2012
(Continued)

OTHER PUBLICATIONS

International Search Report (English and German) and Written Opinion of the ISA (German) issued in PCT/DE2023/100144, mailed Aug. 2, 2023; ISA/EP.
(Continued)

*Primary Examiner* — Lynn E Schwenning
(74) *Attorney, Agent, or Firm* — Harness, Dickey & Pierce, P.L.C.

(57) ABSTRACT

The invention relates to an arrangement for introducing a roll container into a roll container loading station, in particular for filling the roll container with sorted packages in a logistics centre, wherein the roll container is, for example, a forwarding container or an intermediate container, wherein the arrangement has a transport system for transporting roll containers, wherein the transport system connects a receiving location for empty roll containers to the roll container loading station, wherein the transport system has an end position for roll containers transported with the transport system in a loading position of the roll container in the interior of the roll container loading station, and the arrange-
(Continued)

ment has a sensor system with which, in the loading position of the roll container in the interior of the roll container loading station, at least one relative position between the roll container and at least one reference point in the interior of the roll container loading station is determined. Furthermore, a corresponding method is described.

20 Claims, 7 Drawing Sheets (56) References Cited

U.S. PATENT DOCUMENTS

| | | | | |
|---|---|---|---|---|
| 8,801,358 B2 * | 8/2014 | Kussner | ............... | B65G 65/00 |
| | | | | 414/789.9 |
| 2001/0053320 A1 * | 12/2001 | Myers | ................ | B65G 65/00 |
| | | | | 414/397 |
| 2020/0079602 A1 | 3/2020 | Kihlström | | |
| 2020/0130959 A1 * | 4/2020 | Irrenhauser | ............ | B65G 59/04 |

FOREIGN PATENT DOCUMENTS

| | | |
|---|---|---|
| DE | 102012211977 A1 | 3/2014 |
| DE | 102020213124 A1 | 4/2022 |
| EP | 2450112 A1 | 5/2012 |
| EP | 2686260 B1 | 5/2016 |
| EP | 3061712 A1 | 8/2016 |
| EP | 3383745 A1 | 10/2018 |
| EP | 3282336 B1 | 4/2020 |
| EP | 3823916 B1 | 8/2022 |
| EP | 4049949 A1 | 8/2022 |
| FR | 2490197 A1 | 3/1982 |
| JP | 2020027321 A | 2/2020 |
| WO | 2017151897 A1 | 9/2017 |
| WO | 2020171859 A1 | 8/2020 |
| WO | 2020242695 A1 | 12/2020 |

OTHER PUBLICATIONS

German International Preliminary Report on Patentability issued in PCT/DE2023/100144, dated May 7, 2024.

\* cited by examiner

ARRANGEMENT AND METHOD FOR INTRODUCING A ROLL CONTAINER INTO A ROLL CONTAINER LOADING STATION

CROSS-REFERENCE TO RELATED APPLICATIONS

This application is a U.S. National Phase Application under 35 U.S.C. 371 of International Application No. PCT/DE2023/100144, filed on Feb. 23, 2023, which claims the benefit of German Patent Application No. 10 2022 104 554.4, filed on Feb. 25, 2022. The entire disclosures of the above applications are incorporated herein by reference.

BACKGROUND

This section provides background information related to the present disclosure which is not necessarily prior art.

TECHNICAL FIELD

The invention relates to an arrangement and a method for introducing a roll container into a roll container loading station, in particular for filling the roll container, which is, for example, a forwarding container or an intermediate container, with sorted packages in a logistics centre, wherein the arrangement has a transport system for transporting roll containers. The transport system connects a receiving point for empty roll containers to a roll container loading station. Such an arrangement with a transport system based on a rail system is known from EP 3 383 745 A1.

DISCUSSION

Such arrangements and methods for introducing roll containers into roll container loading stations are used in particular in the KEP sector, for example, if presorted consignments, which are stored in buffer stores, have to be reloaded into roll containers by a sorter, such as a resort, for further transport. Further roll container loading stations are known from EP 2 686 260 B1 and from EP 2 450 112 A1.

The arrangements and methods known from the prior art for introducing a roll container into a roll container loading station have the disadvantage that the transport systems used only convey the roll containers up to an entrance of the roll container loading station and the introduction of the roll container into the roll container loading station has to be carried out with manual assistance, or that a comparatively expensive rail system is used to transport the roll container up to a loading position in the interior of the roll container loading station. The rail system in this case has in particular the function of ensuring precise guidance and positioning of the roll container in relation to the roll container loading station on the very last partial section of the transport system into the roll container loading station in order to enable the subsequent loading of the roll container in a process-reliable manner.

SUMMARY

This section provides a general summary of the disclosure and is not a comprehensive disclosure of its full scope or all of its features.

It is therefore one aspect of the invention to propose an arrangement and a corresponding method for introducing a roll container into a roll container loading station, which dispense with such systems while maintaining the precision of positively guided transport systems.

Accordingly, it is provided that the transport system has an end position for roll containers transported with the transport system in a loading position of the roll container in the interior of the roll container loading station, and the arrangement has a sensor system with which, in the loading position of the roll container in the interior of the roll container loading station, at least one relative distance between the roll container and at least one reference point in the interior of the roll container loading station is determined. The relative position of the roll container in relation to the roll container loading station detected by the sensor system can be used to control an actuator system of the transport system. The actuator system can be or have, for example, a steering system of a transport vehicle of the transport system. The transport vehicle can be a driverless transport system (FTS). The use of the sensor system thus makes it possible to dispense with positively guided transport systems for transporting roll containers.

It can thus be provided that the transport system is configured to convey the roll container to be filled from the receiving point up to the final loading position of the roll container loading station in the interior thereof, so that no further, in particular manual, intervention is required. This enables embodiments in which the feeding of the empty roll container to the roll container loading station including the positioning of the roll container in the loading position can be carried out fully automatically. If, in addition, the roll container loading station is designed, for example, according to an embodiment of the subsequently published European patent application 21159642.4, the feeding of the empty roll container to the roll container loading station including the filling of the roll container can be carried out fully automatically. The described sensor system can then furthermore be configured to transport the filled roll container out of the roll container loading station again in a process-reliable manner and to feed it, for example, to a transport vehicle for roll containers, as are usual in the KEP sector, and to load the vehicle with the filled roll container. Finally, the transport system can be configured, at its acceptance point, to remove the roll containers from a collection point for empty roll containers and to feed them to the acceptance point for the transport to the roll container loading station. For this purpose, the transport system can be configured to connect the empty roll containers to one another at the collection point, to line them up and/or to fold them together or, prior to the transfer, to unfold them again at the acceptance point and/or to separate them from one another. The roll containers can be designed as containers with fixed walls or also as containers with a bag suspended therein. Alternatively, the containers can also be designed without rollers.

The sensor system for determining the relative position can have at least one position sensor above the roll container loading station and/or in the interior of the roll container loading station. The position sensor can have at least one optical camera which is arranged in the head region of the roll container loading station. The optical camera can have an optical axis which extends in the vertical direction or at an acute angle to the vertical direction.

If the transport system has a transport vehicle, preferably a driverless transport vehicle (FTS), the sensor system for determining the relative position can have at least one position sensor. The sensor system for determining the relative position can also be exclusively a component of the driverless transport vehicle (FTS). The determination of the relative position can have the determination of at least one absolute position, the guidance via laser positioning, the recognition of at least one QR code, or an inductive magnetic guidance (spot or line), or a simultaneous position determination and mapping (SLAM). The sensor system for determining the relative position can have an acoustic sensor system or another system known from the prior art for determining the position, for example a LIDAR system, a time-of-flight (ToF) system, an ultrasound system, at least one RFID sensor or a system for real-time localization by means of ultra-wideband technology (UWB). However, the sensor system for determining the relative position should not be restricted to these embodiments.

The sensor system can furthermore be configured to detect whether persons or objects, in particular packages and/or persons, are located in the surroundings of the roll container loading station or in the roll container.

The sensor system, in particular the optical camera, can be configured to detect a standing surface of the roll container in the interior of the roll container loading station. For this purpose, it can be provided that a standing surface for the roll container at the loading position in the interior of the roll container loading station lies in the measuring range of the position sensor or in the image field of the optical camera.

If the sensor system has an optical camera, this camera or the sensor system can have an image processing system which can have, for example, edge recognition and can be configured to determine at least one relative distance between the roll container and at least one reference point in the interior of the roll container loading station in the case of a roll container arranged in a loading position in the interior of the roll container loading station. The reference point can be an inner boundary of a roll container receiving space of the roll container loading station. Preferably, the reference point can be an outer wall or a frame of the roll container receiving space or can be arranged on an outer wall or on the frame. The reference point is not necessarily a point in the geometric sense. Rather, it can also be an area or another characteristic geometry with a two-dimensional or three-dimensional extent. The roll container loading station can have a roll container receiving space with an entry for a roll container. The entry can have a light curtain which is configured to detect the entry of a roll container through the entry into the roll container receiving space. The measure serves, on the one hand, for the recognition of the relative arrangement of the roll container in relation to the roll container loading station and can also furthermore be used to ensure that, for example during a loading process in which a loading shaft is lowered into the roll container, no interference contour or a person is arranged in the entry region of the roll container loading station which collides with the lowering shaft or the kinematics of the roll container loading station required for this purpose during the loading process.

The light curtain can be configured to detect the complete entry of the roll container through the entry into the roll container receiving space. For this purpose, the light curtain can be designed as a light barrier which infers the presence of an interference contour, for example of a roll container, merely from the interruption of the light path. In addition, the light curtain can be configured to scan the outer geometry of the roll container during the entry of the roll container through the entry into the roll container receiving space and thereby preferably to detect at least one of height, width, depth and contact area of the roll container.

The roll container receiving space of the roll container loading station can have at least one mechanical guide element, with which the roll container is then guided when entering the roll container receiving space into a loading position of the roll container in the interior of the roll container loading station. The mechanical guide element can be designed, for example, as at least one guide rail and the guide rails can be arranged in a feed region for roll containers in front of the entry of the roll container receiving space and/or in the interior of the roll container receiving space. The mechanical guide element can have the function of introducing the roll container through the entry into the roll container receiving space in a process-reliable manner and/or of positioning the roll container in the loading position.

For the process-reliable positioning of the roll container in the loading position, the roll container can rest against a stop in the loading position. The stop can be a component of the mechanical guide element. The movement of the roll container in the insertion direction of the roll container through the entry of the roll container receiving space into the roll container receiving space is limited by the stop.

The transport system can be or have a driverless transport system (FTS). The driverless transport system can be configured to accept a roll container at the receiving point for empty roll containers and to introduce it into a roll container receiving space of the roll container loading station.

It can be provided that a mechanical coupling between the driverless transport system and the roll container is effected by a lifting mechanism and/or by a frictional connection and/or by interlocking shape contours of the driverless transport system and of the roll container. When using a driverless transport system, for example realized by using a plurality of AGVs, the (roll) container according to the invention can itself also be designed without rollers. It acquires its property as a roll container in this case by the connection to the AGV in the course of the transport, in particular between the receiving point and the roll container loading station. The AGV as a roll container can have a plurality of shelves which space a transport plane of the container from the bottom, wherein the space provided by the shelves can be dimensioned such that an AGV can travel under the transport plane of the container. For transportation, the AGV can have a lifting unit by means of which the container can be lifted. The container can have a loading opening on its upper side, via which package pieces or other articles to be loaded can be loaded into the container. The contact area provided by the shelves can be larger than a cross section of the container. As a result, tipping over of the container during handling can be avoided. A free space can be provided between the transport plane and an underside of the container space. This can serve to remove the container from the AGV by means of a lifting device, for example in an unloading station, and to bring it to an unloading height. The lifting device can have, for example, fork tines which can engage in the free space. The container can have a lateral unloading flap which can be hinged to an upper edge of one of the container walls, such that the unloading flap can be pivoted upward about a horizontal axis. The container bottom can have a slope oriented in the direction of the unloading flap, for example between 20 and 30 degrees, such that packages located in the container can automatically slip out of the container when the unloading opening is opened.

Furthermore, a corresponding unloading station can be provided. This can have a frame in which a parking position for an AGV loaded with a container can be provided. Furthermore, the unloading station can have a lifting device by means of which the container can be lifted from the AGV. The frame can have an entry side via which the AGV can move into the parking position. The lifting device can be arranged opposite the entry side and can be brought into a corresponding receiving orientation during the entry of the AGV such that the fork tines of the lifting device engage in the free space of the container in the course of the AGV moving into the parking position. As a result, it can advantageously be achieved that the AGV does not have to be moved away for the lifting of the container into the unloading position or for the unloading operation. The unloading station can have an operating device by means of which an operator can move the container vertically manually. The unloading station can further have a bag carrying device on which a bag or another suitable container for receiving the packages from the container can be suspended. In this case, the bag can be suspended such that it adjoins a lower edge of the unloading opening of the container. In order to transfer the packages from the container into the bag, it is now merely necessary for the unloading flap to be pivoted open, such that the packages located in the container slip into the bag via the sloped container bottom. Thereafter, the container can be lowered back onto the AGV, which is subsequently moved to a free unloading position along the sorter.

The driverless transport system can have the sensor system or at least one sensor of the sensor system, preferably at least one optical camera. The sensor system can be configured to determine a relative position of the roll container in relation to the roll container loading station continuously or periodically when the roll container is introduced into the roll container receiving space. Alternatively, the roll container loading station can have a sensor system which is configured to determine the relative arrangement of the roll container in relation to the roll container loading station. For this purpose, it can be provided that the driverless transport system has at least one optically detectable indicator, for example a multidimensional color pattern or a three-dimensional geometry, which is detected by the optical camera by means of image processing, and from which conclusions can be drawn about the position and relative orientation of the driverless transport system.

The immediate surroundings of the roll container loading station, preferably at least one entry region in front of an entry into a roll container receiving space of the roll container loading station, can be monitored for the presence of persons or objects by a safety device. This makes it possible, in contrast to the roll container loading stations known from the prior art, for the entry of the roll container receiving space to be designed to be permanently open and preferably free of a closing element, for example free of a roll gate. The closing elements, in particular the abovementioned roll gates, are required in the case of the loading stations known from the prior art on account of the manual positioning of the roll containers in the interior of the roll container receiving space of the roll container loading station, in order to avoid an accidental collision of a person with, for example, a lowering shaft during the filling of the roll container.

According to another aspect of the invention, a method for introducing a roll container into a roll container loading station is described. The arrangement described above can be used for carrying out the method.

Accordingly, it is provided in the case of the method that the roll container is transported with a transport system between a receiving point for empty roll containers and a roll container loading station. In this case, a relative position of the roll container in relation to the roll container loading station is determined with a sensor system, as a result of which the precise guidance of the roll container in relation to the roll container loading station which is sought according to the invention is achieved without the use of positive guidance.

At least one relative distance between the roll container and at least one reference point in the interior of the roll container loading station can be determined with the sensor system in a loading position of the roll container in the interior of the roll container loading station.

The entry of a roll container through an entry of the roll container loading station into a roll container receiving space of the roll container loading station can be detected in that during the entry of the roll container through the entry a light curtain of the entry is traversed and thereby broken. In this case, the complete entry of the roll container through the entry into the roll container receiving space with the light curtain can be detected, for example, in that after the first interruption of the light curtain above an expected height of a roll container, the light curtain is closed again. Alternatively or additionally, during the entry of the roll container through the entry into the roll container receiving space an outer geometry of the roll container can be scanned with the light curtain, wherein preferably at least one of height, width, depth and contact area of the roll container is determined.

A driverless transport system of the transport system can accept a roll container at the receiving point for empty roll containers, and for this purpose, for example, receive and/or lift it, transport it from the receiving point to the roll container loading station and introduce it into a roll container receiving space of the roll container loading station.

The sensor system can determine a relative position of the roll container in relation to the roll container loading station continuously or periodically at least during the introduction of the roll container into the roll container receiving space with the driverless transport system.

The method can further provide that during a loading process of the roll container with packages either
  a. the roll container to be loaded is held in a position inclined to the vertical or is pivoted from this position into an upright position, wherein the vertical distance between a filling opening of the roll container and a bottom of the roll container is increased continuously or stepwise, or
  b. a height-adjustable shaft of the roll container loading station is filled with the sorted piece goods and lowered in the roll container to be loaded, and wherein the sorted piece goods are emptied from the shaft into the roll container when the shaft has reached a lower position as a result of the lowering, or
  c. the compact piece goods stream is fed by a feed conveyor of a conveying section to a piece goods collection point, from which the piece goods of the piece goods stream are metered into the roll container by a robot.

The driverless transport system can remain coupled to the roll container during the loading process when the latter is not pivoted during the loading, or can be separated from the latter when the roll container is pivoted during the loading process.

It can further be provided that the filling level of the roll container is monitored by means of a detection device during the loading process. As a result, the process reliability can be further increased within the scope of the filling-level-optimized filling of the roll container. A camera system or another sensor system can be provided as a detection device, which detects the filling level, in particular the empty state, of the roll container before the latter is filled. The detection device can further be provided with a further camera system or equivalent sensor system in order to detect a filling level of the roll container after the filling of the roll container. For this purpose, for example, an image of the roll container or of the filling opening of the roll container can be recorded from above the roll container. By means of the comparison with reference images in an image memory, it can be determined to what extent the optimal filling level of the roll container is reached. The image of the roll container stored in the image memory can be linked to the individual weighted volumes and possibly further properties of the packages in the roll container.

By means of the comparison of the determined filling level and by means of the assignment of the filling level to the weighted volumes linked to the filling level via the image, an optimization of the loading process of the roll container can be achieved. From a multiplicity of filling level images which are linked to the respective weighted volumes, regularities can be identified by machine learning which lead to underfilling or overfilling of the roll container. Thus, for example, it can be identified that the proportion of small and/or compressible packages 1 can be increased if a certain proportion of bulky packages is present which form teaching spaces which can fill the small and compressible packages. This can lead to the weighting factor of the small and/or compressible packages being further reduced. The determination of the filling level also increases the process reliability. This is because, by limiting the filling to a predetermined extent, it can be prevented that packages project beyond the filling opening of the roll container and can then fall out during the subsequent transport.

It can be provided that the loading process of the roll container comprises the transfer of packages from a sorter via an end point into the roll container. In this case, the roll container loading station can be realized by a parking bay for a container along the sorting section. A corresponding roll container loading station can have a chute via which the packages can fall into a container opening in the container. Furthermore, the parking bay can provide a loading position for the container, which represents an end position for a container transported with a transport system, in particular a driverless transport system. The parking bay can be designed such that the container can move into it at least in sections. For example, the parking bay can have two lateral boundary walls which extend perpendicularly away from the sorting section and which at least in sections encompass a container located in the loading position. A sensor system can now be provided in this parking bay and/or on the driverless transport system, with which sensor system at least one relative position between the container and at least one reference point in the interior of the parking bay is determined in the loading position of the container in the interior of the roll container loading station, that is to say in the parking bay.

Furthermore, the sorting of the packages intended for the roll container can be effected on the basis of object-specific features, such as, for example, a barcode or an address. Alternatively or additionally, the sorting of the packages can be effected on the basis of a sorting plan.

Furthermore, it can be provided that the method further comprises the acquisition of data relating to the dimensions of the packages conveyed on the sorter, and determining on the basis of the data of the packages loaded into the roll container whether the roll container is filled. For this purpose, a controller can be provided which, on the one hand, acquires the data relating to the dimensions of the packages, which data are acquired by means of a measuring device in the course of the conveying of the packages via the sorter, wherein the controller is further configured to calculate the current filling level of the roll container on the basis of the data of the packages loaded into the roll container by means of the known dimensions of the packages.

The method can further provide the automatic loading of a plurality of roll containers simultaneously via the sorter. By means of the controller, it is determined when or whether the respective roll containers are filled on the basis of the size or the volume of the packages. In this case, the roll containers can be used logically as end points and assigned to the system. As soon as a roll container is identified as full by means of the controller, it can be transported away by means of a driverless transport vehicle and an empty roll container can assume the position or the end point of the previous roll container at the respective sorter outlet by means of a further driverless transport vehicle.

The invention makes possible embodiments which provide fully automated roll container handling, in which, for example, full roll containers are unloaded from transport vehicles of the KEP sector and fed to a, preferably fully automated, unloading station for roll containers. Depending on the roll container, it can be provided to transfer them from the transport system plugged together (reduced in size) to a storage position. For the loading of the roll containers, they can be automatically removed from a storage point with the transport system and fed to the roll container loading station in the manner described above, filled there in a fully automated manner and subsequently transported to the vehicle to be loaded. As an alternative to the transport to a transport vehicle, the roll container can also be deposited or temporarily stored at a storage point.

Although the invention aims at eliminating the disadvantages of positively guided systems, embodiments of arrangements according to the invention, at least parts of the transport system, can have a positively guided transport system, for example a rail system. As an alternative to a rail system, such a positively guided transport system can also have driver elements for roll containers which are countersunk into the bottom and which are driven along the conveying section.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Further details of the invention will be explained with reference to the following figures. In the figures.

DETAILED DESCRIPTION

Example embodiments will now be described more fully with reference to the accompanying drawings.

Figure 1:
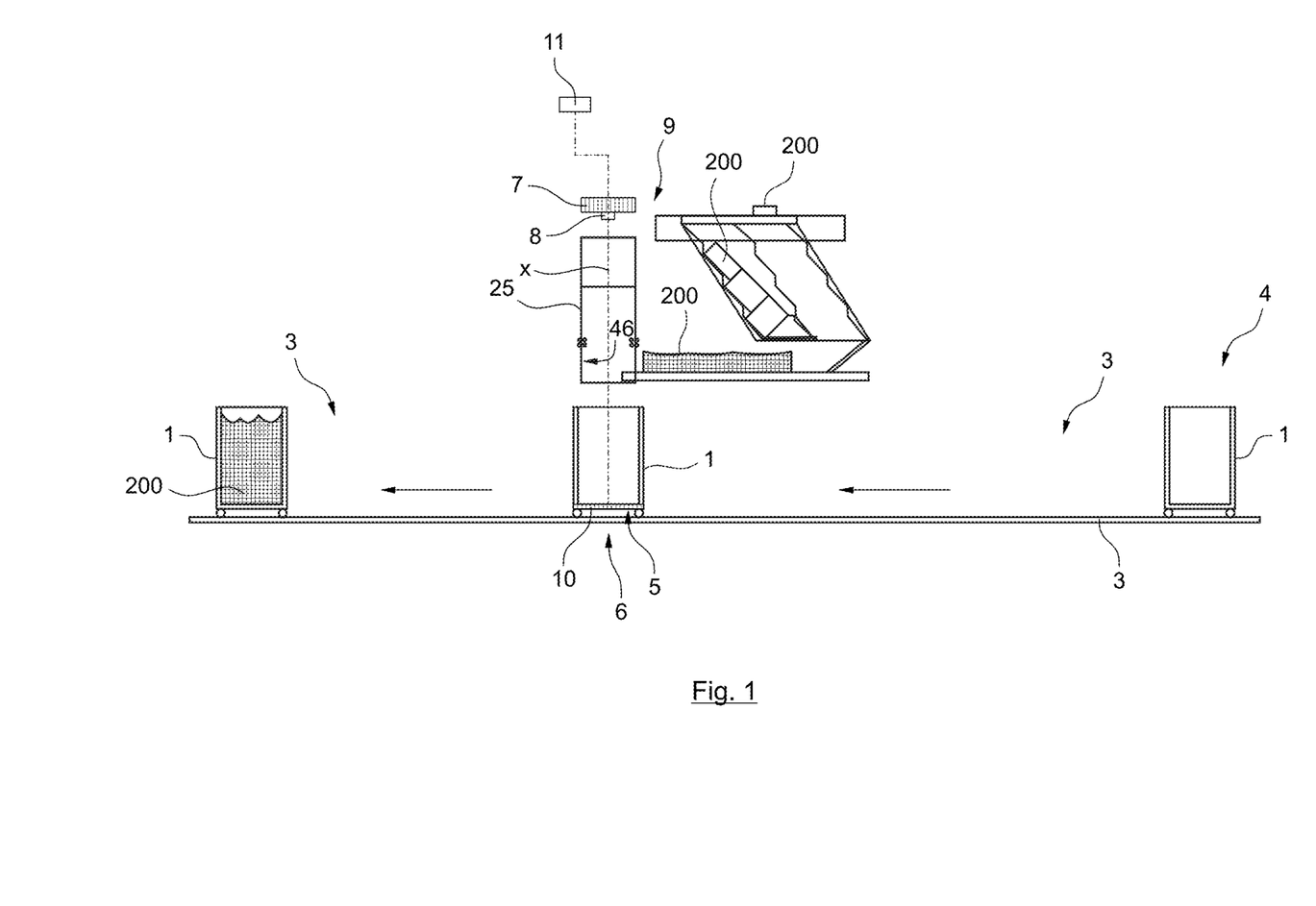
FIG. 1 shows an exemplary embodiment of an arrangement according to the invention for introducing a roll container into a roll container loading station.

FIG. 1 shows a schematic representation of an arrangement for the feeding and loading of a roll container 1 in a roll container loading station 2. Accordingly, at least one roll container 1 and preferably a whole multiplicity of roll containers is provided at a receiving point 4 for roll containers 1. The roll containers 1 can, for example, be stored and/or pushed into one another and/or provided in a manner linked to one another at the receiving point 4. At the receiving point 4, the roll containers 1 can then, if required, be separated from one another by the transport system 3 and fed individually to the roll container loading station 2. The feeding can preferably be carried out without positive guidance. Accordingly, the transport system 3 can be, for example, a self-propelled transport system (FTS). However, according to the invention, it can also be provided that the distance between the receiving point 4 and the roll container loading station 2 is positively guided at least proportionally, while the positioning of the empty roll container 1 in the interior of the roll container loading station 2 is effected with sensor support and without positive guidance, wherein a sensor system 5, 7 of the arrangement determines a relative position of the roll container 1 in relation to the roll container loading station 2. If required, the sensor system 5, 7 can detect a positional deviation of the roll container 1 from a setpoint position or from a setpoint distance covered by the roll container 1, in order either to act on an actuator system for steering the roll container 1 or the transport system 3 or at least to output an error signal or to interrupt the loading process, in order to avoid a collision between the not correctly positioned roll container 1 and, for example, the shaft 25 of the roll container loading station 2 which is lowered into the roll container 1 for the loading of the roll container 1.

The sensor system 5 can have an image processing system 11 with an optical camera 7 having an optical axis "x" in the head region 9 of the roll container loading station 2, with which a standing surface 10 for the roll container 1 in the bottom region of the roll container loading station is monitored. With the aid of optical image processing and, for example, edge recognition, it is possible to infer the relative position of the roll container 1 in relation to the roll container loading station 2 from the camera image which shows, on the one hand, the horizontal cross section of the roll container 1 and, on the other hand, the inner boundary of the roll container loading space indicated by reference number 46. This in turn provides information as to whether, during the lowering of the shaft 25, the latter can be lowered into the roll container 1 in a process-reliable manner or whether a collision between the shaft 25 and the roll container 1 has to be expected.

After the filling of the roll container 1, the shaft 25 can be lifted out of the roll container 1 again, after which the filled roll container 1 can be transported out of the loading station 2 with the transport system 3 and fed, for example, on a transport vehicle for the further transport of the filled roll container 1.

Figure 2:
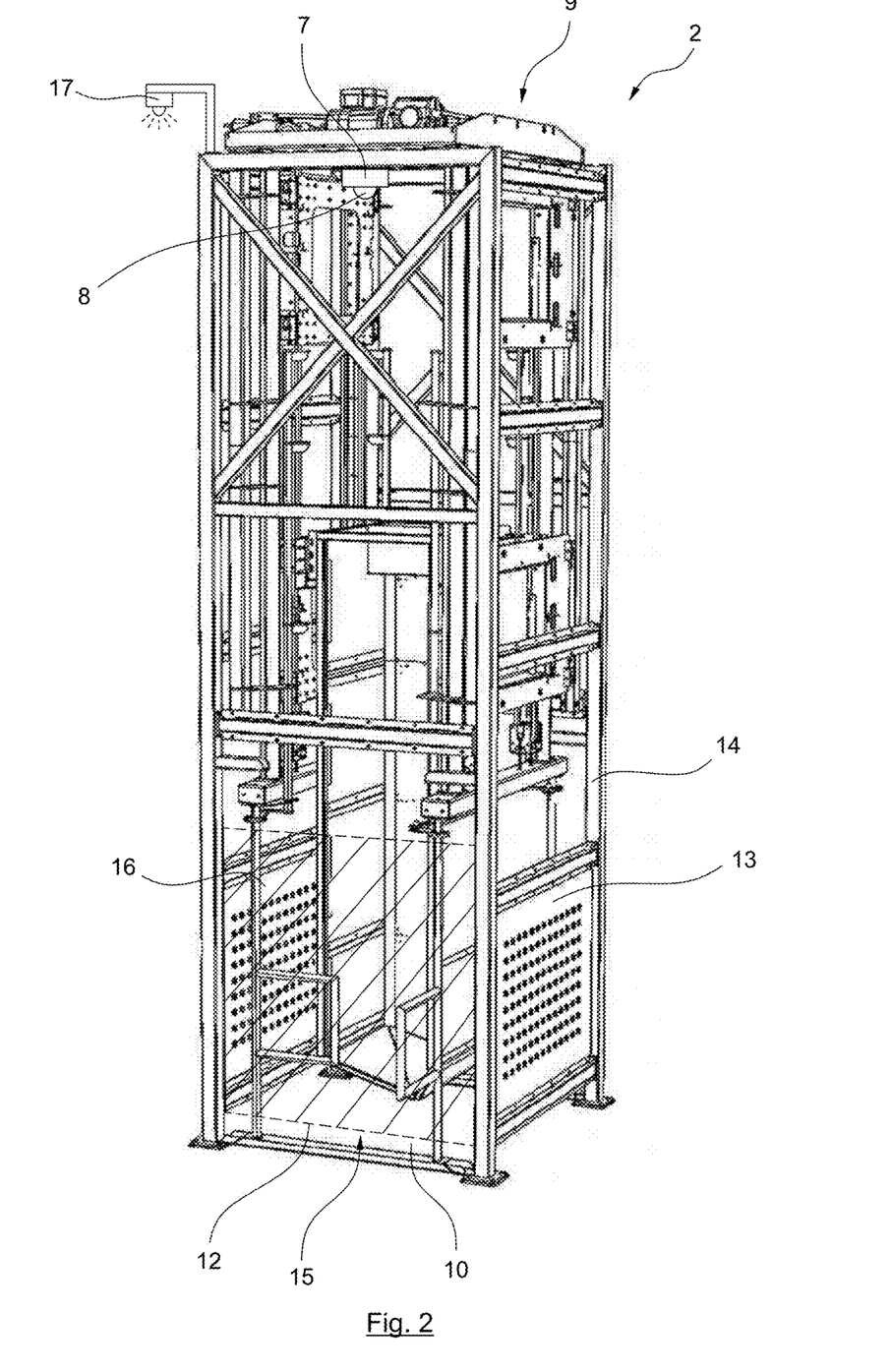
FIG. 2 shows an exemplary embodiment of a roll container loading station.

FIG. 2 shows in detail an exemplary embodiment of a roll container loading station which is designed, in particular, as a closed system, with a frame 14 which has a height-adjustable shaft 25. With the loading station 2, the shaft 25 can be transferred from an upper, raised position into a lowered position in which the shaft 25 is lowered into the roll container (not illustrated) located in the lower roll container receiving space 12, in order to empty the shaft 25 into the roll container 1.

In the head region 9, the roll container loading station 2 has a position sensor 7 which can be designed, for example, as an optical camera 8 or can have such an optical camera. In the manner already described with reference to FIG. 1, the position sensor 7, in particular the optical camera 8, can be configured to monitor the roll container receiving space 12 in a vertical viewing direction from above onto the standing surface 10 for a roll container 1, in particular a relative position of a roll container 1 located on the standing surface 10 in relation to the roll container loading station 2, in particular the frame 14 and/or a wall 13.

A safety device 17 is provided to monitor the entry 15 of the roll container receiving space 12 for persons or objects which are arranged in the access region of the roll container receiving space 12. This makes it possible to design the roll container receiving space 12 to be permanently open and in particular free of a closing element 18, for example of a roll gate, which is usually used in the prior art.

The roll container loading station 2 substantially has a tower-like frame 14 which is formed from profiles and which, in the head region 9, has drive means analogous to a person elevator, with which the shaft 25 can be displaced in the vertical direction. The shaft 25 in turn has a wall element on each of three vertical outer sides and a side which is open over the entire vertical height. On an underside, the shaft 25 has a closable opening which can be opened and closed again via a flap, here a two-part flap. The two part flaps of the flap element can be locked via an actuating drive in virtually any desired actuating position between a completely open and a completely closed position, so that the opening cross section of the opening is adjustable to the extent that a gentle and continuous outflow of the piece goods from the shaft into a container (not illustrated) can be achieved.

Figure 3:
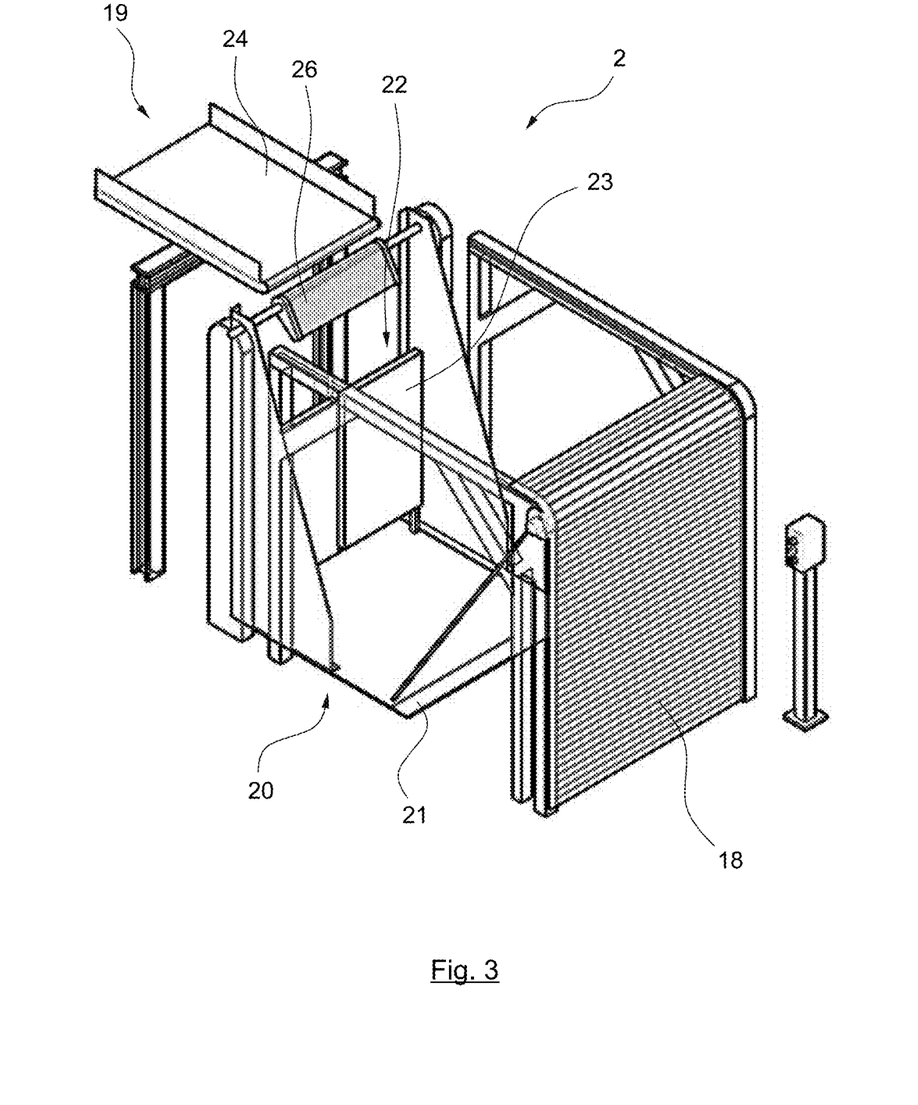
FIG. 3 shows a further embodiment of a roll container loading station.

FIG. 3 shows a further embodiment of a roll container loading station 2. The roll container loading station 2 has a frame 14 with a pivoting device 20 which is received therein. The pivoting device 20 has a standing surface 21 with side walls which extend perpendicularly thereto. At the rear, the pivoting device 20 has a pair of door wings 23 which can be pivoted in opposite directions, in order to release the rear part of the pivoting device 20 if required, and therefore to open it, in order to enable the insertion and the removal of a roll container 100.

A safety roller shutter 18 can be pushed over the pivoting device 20 and a roll container 100 can subsequently be pushed in. After the filling, the roller shutter 18 travels again over the region in order to protect the remover. The door wings 23 can then be opened and the container 100 can be pulled out of the roll container loading station 2.

The roll gate 18 provided in the embodiment of a roll container loading station 2 according to FIG. 3 can optionally be omitted if a safety device 17 according to the embodiment according to FIG. 2 is also implemented in the embodiment according to FIG. 3.

Figure 4:
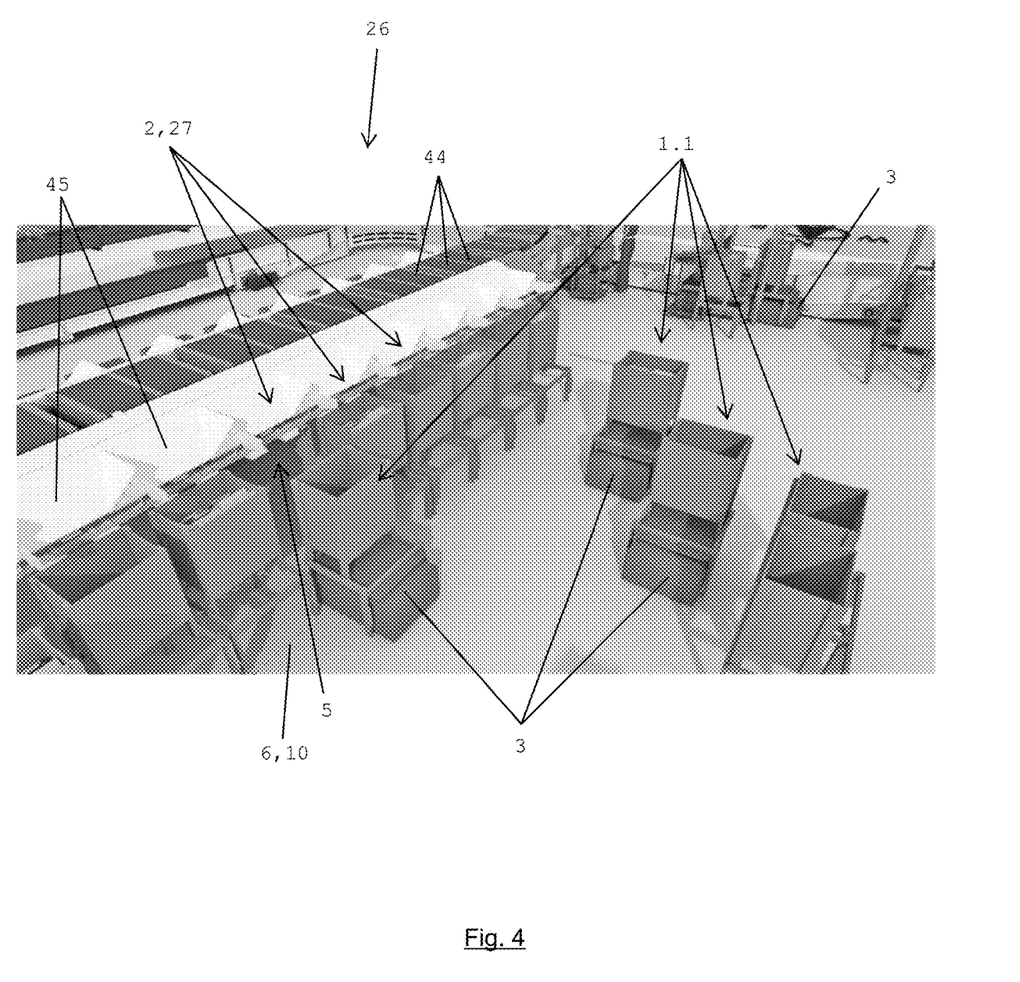
FIG. 4 shows a further embodiment of a roll container loading station.
Figure 5:
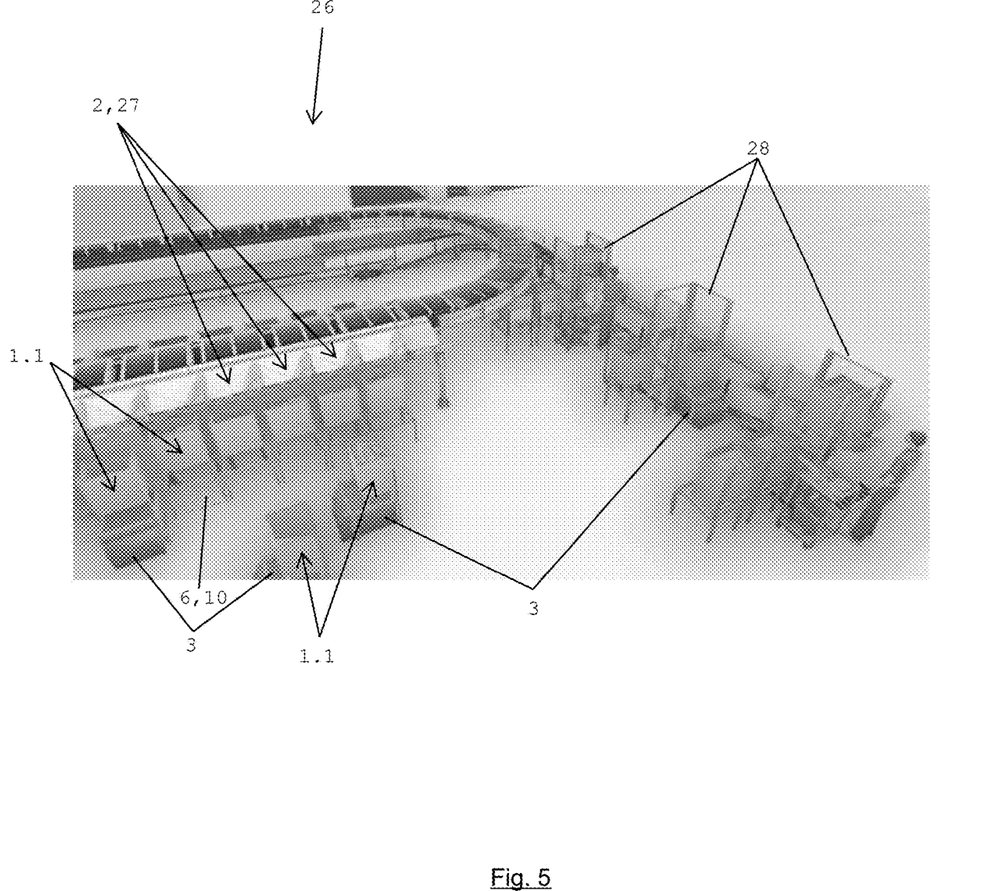
FIG. 5 shows the embodiment of the roll container loading station according to FIG. 4.

FIGS. 4 and 5 show an embodiment of the roll container loading station 2 in which it is designed as an outlet of a cross belt sorter 26. It has a main conveying direction, along which a piece goods stream of packages is conveyed. The cross belt sorter 26 consists of a multiplicity of cross belts 44 which are arranged next to one another and the conveying direction of which extends perpendicularly to the main conveying direction. Laterally along the main conveying direction, the sorter 26 has a plurality of end points 27 which are arranged next to one another and at which, in order to sort the packages, they can be discharged in a targeted manner at an intended end point 27. When an end point 27 intended for a package is reached, the respective cross belt 44 is activated and the package transported thereon is discharged from the sorter 26 transversely to the main conveying direction. In this case, a chute 45 is provided in each case between the cross belt 44 and the end point 27, via which chute 45 the packages can in each case slide into a provided container 1.1. In this case, the end points 27 each represent a roll container loading station 2. A rollless container 1.1 is positioned on them in each case in a loading position 6 and oriented by means of a sensor system 5. The loading position 6 comprises an intended standing surface 10, within which the container 1.1 has to be positioned in order to receive the packages. If a package is now discharged from the sorter 26, it falls into the provided container 1.1. The transport of the containers 1.1 between the end points 27 and a plurality of container unloading stations 28 is effected by means of AGVs 3. For this purpose, the containers 2 each have, on their underside, an AGV receiving region 32 into which they can enter and can lift them for transport by means of a lifting unit 42. The container unloading stations 28 are each designed as a manual workstation at which the containers 1.1 are refilled into bags. The containers 1.1 can, for example, be moved directly from one of the end points 27 into an intended or free container unloading station 28. Alternatively, it can be provided that, in the case of a just occupied container unloading station 28, the container 1.1 is lined up in a queue upstream of the container unloading station 28. In this case, for example, a first AGV 3 can be provided for the transfer between the end points and one of the container unloading stations 28 and a second AGV can be provided for the entry of the containers 1.1 waiting upstream of the container unloading station 28 into the container unloading station 28 or for the renewed provision of the then emptied containers 1.1.

Figure 6:
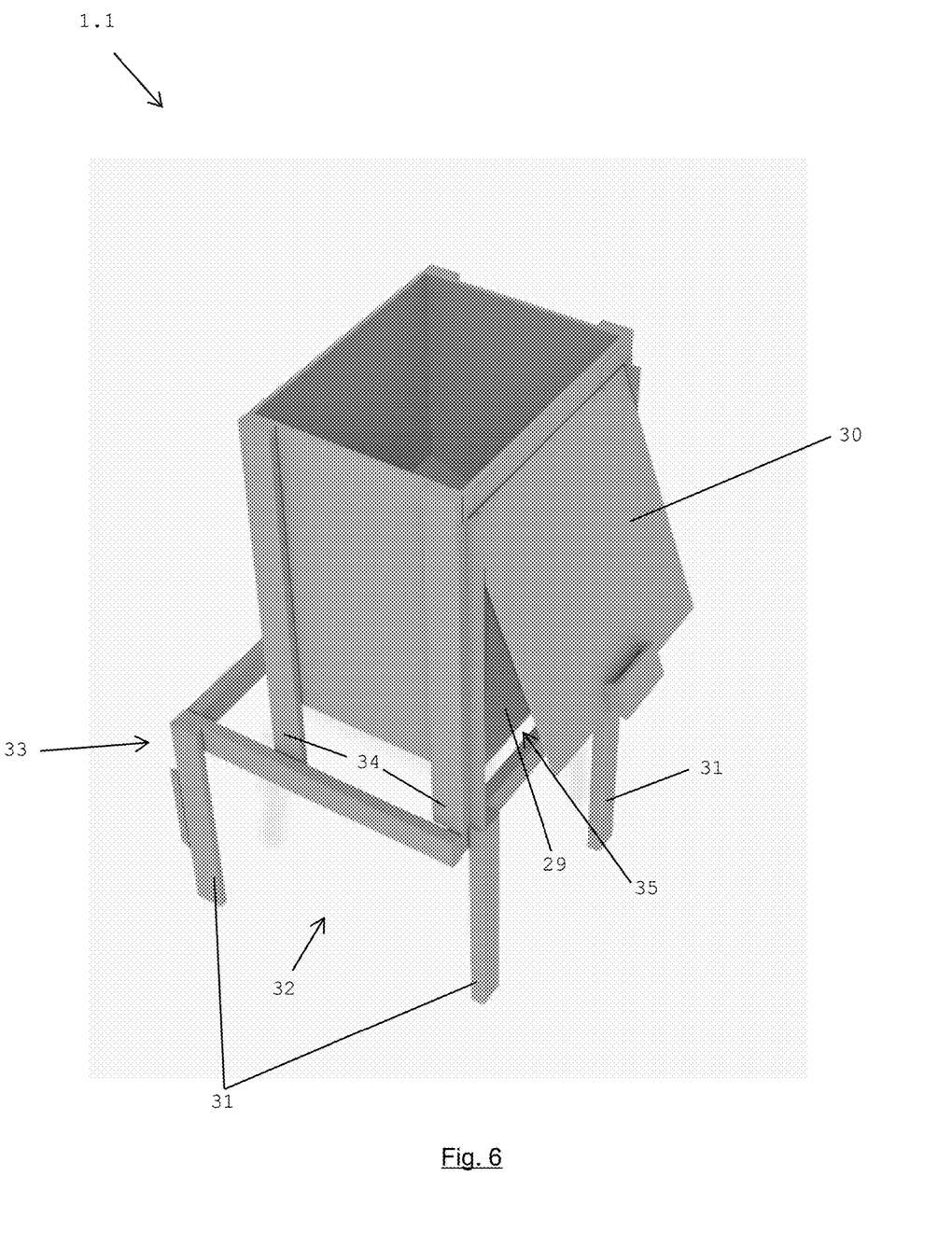
FIG. 6 shows a container according to the embodiment of the roll container loading station according to one of FIG. 4 or 5.

FIG. 6 shows a detailed view of a rollless container 1.1 which, in conjunction with an AGV 3, is to be understood as a roll container 1 in the sense of the invention. The container 1.1 has a body which is mounted on shelves 31 such that a transport plane 33 of the container 1.1 is spaced apart from the bottom. As a result, an AGV receiving region 32 is provided which is configured to receive an AGV. Above the transport plane 33, a free space 35 is provided which is realized by supports 34 which space the container body from the transport plane 33. The free space 35 serves for a lifting device 37 of a container unloading station 28 to be able to engage in the free space 35 in the course of the entry of the container 1.1 into the container unloading station 28, such that the container 1.1 which is still located on the AGV 3 can be lifted by means of the lifting device 37. The container 1.1 has a loading opening on its upper side, in order to receive packages via said loading opening from a chute 45 of an unloading point 27 of a sorter 26. The container bottom 29 has a slope which is oriented in the direction of an unloading flap 30. The unloading flap 30 is hinged to an upper edge of a container wall and has a horizontal pivot axis, such that the unloading flap 30 can be pivoted upward from below. As a result, the container contents can be emptied by simply opening the unloading flap 30, in that the packages automatically slip out of the container bottom 29 on account of the slope of the latter.

Figure 7:
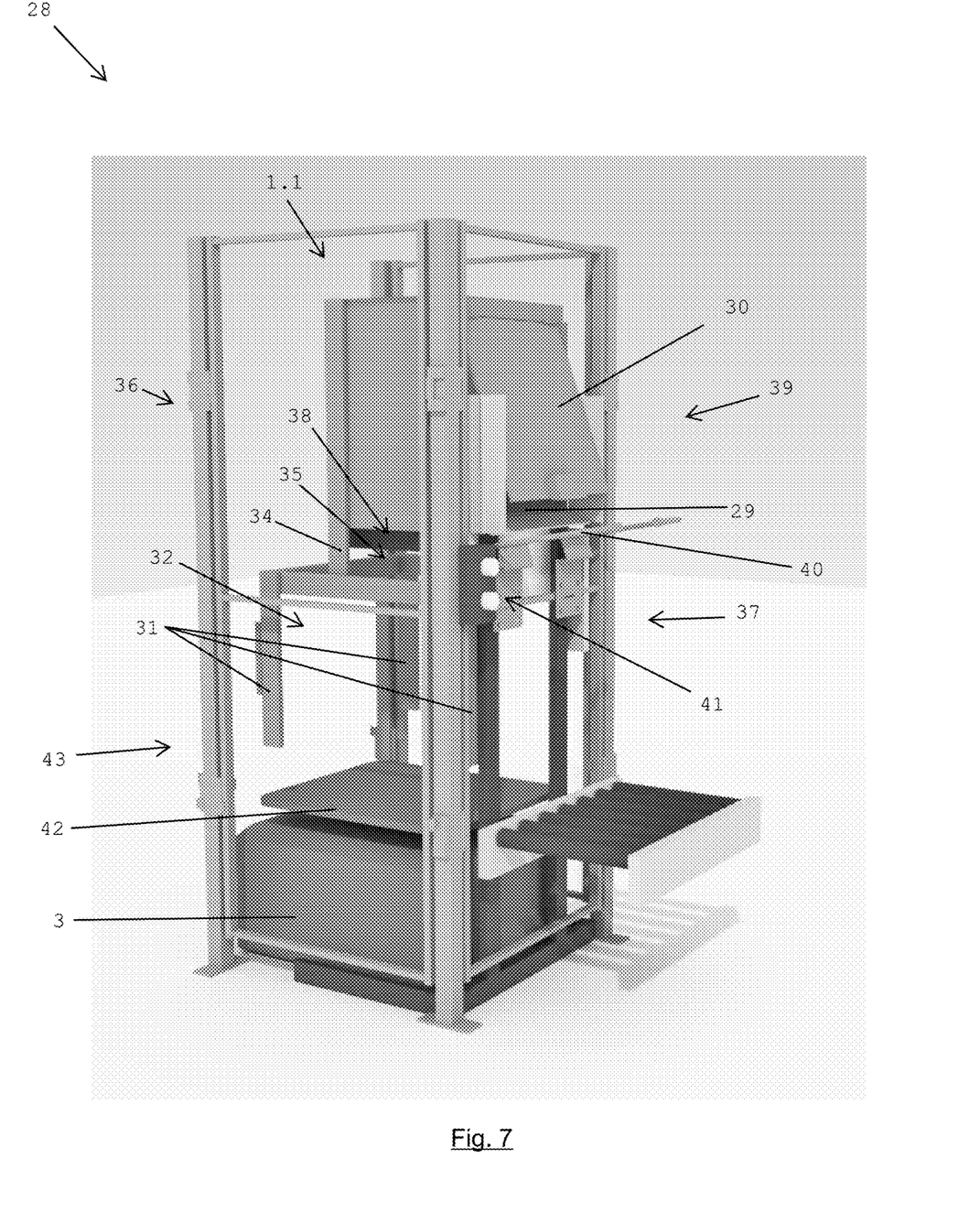
FIG. 7 shows an unloading station according to one of the embodiments of the roll container loading station according to one of FIG. 4 or 5.

FIG. 7 shows a container unloading station 28 in the state of a container 1.1 which is lifted by a lifting unit 42 of an AGV 3. This substantially has a frame 36 with a receiving region for an AGV with a container 1.1 loaded thereon, and a lifting device 37 which is fastened to the frame and has a manual operating unit 41. The AGV 3 has previously been moved together with the container 1.1 which is mounted on the lifting unit via an entry side 43 into the container unloading station 28, wherein, in the course of the entry, the fork tines 38 of the lifting device 37 of the container unloading station 28 have engaged in the free space 35 of the container 1.1. In order to lift the container 1.1 from the AGV 3, the lifting device 37 can be adjusted in height manually by means of the operating unit 41. In the illustration shown, the container 1.1 has arrived in the final unloading position, so that the unloading opening adjoins a bag carrying device 40 (no bag is suspended in the illustration for the sake of clarity). The unloading side 39 is located opposite the entry side 43. When the operator now opens the unloading flap 30 of the container 1.1, the container contents automatically slip into the bag which is suspended on the bag carrying device 40 on account of the sloped container bottom 29. After successful emptying of the container 1.1, the latter is lowered back onto the AGV by manual actuation of the operating unit 41. Subsequently, the AGV moves the container 1.1 out of the container unloading station 28 and a further filled container can be moved into the container unloading station 28. The features of the invention which are disclosed in the above description, in the drawing and in the claims can be essential both individually and in any desired combination for the realization of the invention.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An arrangement for introducing a roll container into a roll container loading station for filling the roll container with sorted packages in a logistics centre, comprising:
   a roll container which has a loading opening on its upper side, via which parcels or other articles to be loaded can be loaded into the container wherein the roll container is a forwarding container or an intermediate container, and with a roll container loading station, wherein the arrangement has a transport system for transporting roll containers, wherein the transport system connects a receiving location for empty roll containers to the roll container loading station, wherein the transport system has an end position for roll containers transported with the transport system in a loading position of the roll container in the interior of the roll container loading station, and the arrangement has a sensor system, wherein the sensor system has an optical camera in the interior of the roll container loading station, the optical camera or the sensor system having an image processing system which is set up to determine at least one relative distance between the roll container and at least one reference point inside the roll container loading station when a roll container is arranged in the loading position inside the roll container loading station, wherein the reference point is an inner boundary of a roll container receiving space of the roll container loading station.

2. The arrangement according to claim 1, wherein the optical camera is arranged in a head region of the roll container loading station, wherein the optical camera has an optical axis which extends in the vertical direction or at an acute angle to the vertical direction.

3. The arrangement according to claim 1, wherein the roll container receiving space has an entry for a roll container, wherein the entry has a light curtain which is configured to detect the entry of a roll container through the entry into the roll container receiving space.

4. The arrangement according to claim 3, wherein the light curtain is configured to detect the complete entry of the roll container through the entry into the roll container receiving space and/or to scan an outer geometry of the roll container during the entry of the roll container through the entry into the roll container receiving space and thereby detect at least one of height, width, depth and contact area of the roll container.

5. The arrangement according to claim 1, wherein a roll container receiving space of the roll container loading station has at least one mechanical guide element with which a roll container is guided when entering the roll container receiving space into a loading position of the roll container in the interior of the roll container loading station.

6. The arrangement according to claim 5, wherein the roll container in the loading position rests against a stop with which a movement of the roll container in the insertion direction of the roll container through an entry of the roll container receiving space into the roll container receiving space is limited.

7. The arrangement according to claim 1, wherein the transport system is or has a driverless transport system, wherein the driverless transport system is configured to accept a roll container at an acceptance point for empty roll containers and to introduce it into a roll container receiving space of the roll container loading station.

8. The arrangement according to claim 7, wherein a mechanical coupling between the driverless transport system and the roll container is effected by a frictional connection and/or by a lifting mechanism and/or by interlocking shape contours of the driverless transport system and of the roll container.

9. The arrangement according to claim 8, wherein the driverless transport system has at least one optical camera, which is configured to determine a relative position of the roll container in relation to the roll container loading station continuously or periodically when the roll container is introduced into the roll container receiving space.

10. The arrangement according to claim 1, wherein the immediate surroundings of the roll container loading station are monitored for the presence of persons or objects by a safety device.

11. The arrangement according to claim 10, wherein the entry of the roll container receiving space is free of a closing element.

12. A method for introducing a roll container into a roll container loading station as defined in claim 1, where in the role container is transported with a transport system between a receiving point for empty roll containers and a roll container loading station, comprising:

determining a relative position of the role container with respect to the role container loading station by a sensor, wherein the entry of a roll container through an entry into a roll container receiving space is detected in that during the entry of the roll container through the entry a light curtain of the entry is traversed and thereby broken, wherein a complete entry of the roll container through the entry into the roll container receiving space is detected with the light curtain and/or during the entry of the roll container through the entry into the roll container receiving space an outer geometry of the roll container is scanned with the light curtain.

13. The method according to claim 12, wherein a driverless transport system of the transport system accepts a roll container at the receiving point for empty roll containers, transports it from the receiving point to the roll container loading station and introduces it into a roll container receiving space of the roll container loading station.

14. The method according to claim 13, wherein the sensor system determines a relative position of the roll container in relation to the roll container loading station continuously or periodically at least during the introduction of the roll container into the roll container receiving space with the driverless transport system.

15. The method according to claim 13, wherein during a loading process of the roll container with packages either:
  a. the roll container to be loaded is held in a position inclined to the vertical or is pivoted from this position into an upright position, wherein the vertical distance between a filling opening of the roll container and a bottom of the roll container is increased continuously or stepwise, or
  b. a height-adjustable shaft of the roll container loading station is filled with sorted piece goods and lowered in the roll container to be loaded, and wherein the sorted piece goods are emptied from the shaft into the roll container when the shaft has reached a lower position as a result of the lowering, or
  c. a compact piece goods stream is fed by a feed conveyor of a conveying section to a piece goods collection point, from which the piece goods of the piece goods stream are metered into the roll container by a robot, or
  d. the transfer of packages from a sorter via an end point into the roll container.

16. The method according to claim 15, wherein the driverless transport system remains coupled to the roll container during the loading process when the latter is not pivoted during the loading, or is separated from the latter when the roll container is pivoted during the loading process.

17. The method according to claim 15, wherein the filling level of the roll container is monitored by means of a detection device during the loading process.

18. The method according to claim 15, wherein the sorting of the packages intended for the roll container is effected on the basis of object-specific features.

19. The method according to claim 18, comprising the sorting of the packages on the basis of a sorting plan, wherein the sorting plan comprises the determination of a roll container sequence and the early recognition of the reaching of a maximum filling level of a currently filled roll container, wherein in the case of an imminent maximum filling level a further empty container is provided.

20. The method according to claim 15, further comprising:
  acquiring data relating to the dimensions of the packages conveyed on the sorter; and determining, on the basis of the data of the packages loaded into the roll container, whether the roll container is filled.

* * * * *